United States Patent [19]

Schmidt

[11] 3,711,136
[45] Jan. 16, 1973

[54] VEHICLE BALL JOINT WITH CRIMPED HOUSING AND METHOD AND APPARATUS FOR FORMING SAME

[75] Inventor: Andreas Schmidt, Osterath-Vovert, Germany

[73] Assignee: A. Ehrenreich & Cie, Dusseldorf-Oberkassel, Germany

[22] Filed: Feb. 25, 1971

[21] Appl. No.: 118,884

[30] Foreign Application Priority Data

Feb. 26, 1970 Germany......................P 20 08 935.4

[52] U.S. Cl..........................................287/87, 287/21
[51] Int. Cl...............................................F16c 11/06
[58] Field of Search ...............287/87, 90 R, 90 C, 21

[56] References Cited

UNITED STATES PATENTS

| | | | |
|---|---|---|---|
| 1,123,796 | 1/1915 | Porter et al. | 287/90 C |
| 2,182,601 | 12/1939 | Venditty | 287/90 C |
| 3,073,634 | 1/1963 | Gottschald | 287/90 C |
| 3,329,454 | 7/1967 | Meltou et al. | 287/90 R |
| 3,482,487 | 12/1969 | Leffers | 287/90 R X |

*Primary Examiner*—Andrew V. Kundrat
*Attorney*—Arthur Schwartz

[57] ABSTRACT

A ball and socket joint for a vehicle having a crimped housing; and a method of and apparatus for forming the crimped housing which includes pressing a die having a concave opening against a cylindrical housing to crimp down the wall thereof to conform with the ball head.

1 Claim, 3 Drawing Figures

PATENTED JAN 16 1973  3,711,136

INVENTOR
ANDREAS SCHMIDT

BY *Arthur Schwartz*

ATTORNEY

VEHICLE BALL JOINT WITH CRIMPED HOUSING AND METHOD AND APPARATUS FOR FORMING SAME

BACKGROUND OF THE INVENTION

1. Field of the Invention

The invention relates to ball joints, and in particular to a method of fabricating a vehicle ball joint wherein the joint housing at least partially surrounds the ball head. The assembling is accomplished by a clamping operation on the joint housing with a resilient element supporting the ball on the side opposite to the ball pin.

2. Description of the Prior Art

It is known to assemble ball joints by using a crimping operation on the housing, whereby the ball head is surrounded by a shroud which is saturated with a synthetic resin. The housing itself is provided with a corresponding liner which together with the housing is formed around the ball head. Thus, the ball head, when assembled, is merely retained by a more or less tight clamping configuration which does not offer any resilient yielding.

Another known ball joint is likewise assembled in a crimping operation of the above mentioned kind. In it is provided a cylindrical joint housing comprising on its closed end a spring element in the form of a socket shaped metal spring disc. The joint housing is directly crimped onto the ball head. This type of ball joint has shortcomings in regard to ease of motion and freedom from maintenance.

SUMMARY OF THE INVENTION

It is an object of the present invention to provide a ball joint for vehicles where the ball head on the joint pin, after insertion into a cylindrical recess in the housing, is retained therein by crimping a portion of the housing onto the ball head. The ball joint thus obtained is absolutely precise, with good mobility and efficiency, including the desired elasticity, the assembly requiring a minimum of maintenance.

The invention, therefore, comprises a ball joint including a preformed bearing ring of hard synthetic plastic on the pin side of the ball head, the resilient element being an elastic bearing socket. The ball joint further includes a space between the bearing ring and the bearing socket to allow slow deformation of the resilient bearing socket. The annular end face of the housing exit opening serves as a tool stroke limiting abutment bevel in cooperation with an intermediate exterior shoulder provided on the crimping die in a concentric arrangement with the central bore for the passage of the joint pin through the die.

The invention thus offers, in conjunction with an advantageous assembly operation, a ball joint with adequate precision, no maintenance, and which, in mass production, assures that all the ball joints will have consistent ease of mobility and satisfactory operation. The provision of a preformed bearing ring of hard synthetic plastic on the exit side of the joint pin and a special resilient bearing socket on the closed side of the housing, including a space between the two bearing elements, assures that the pressure applied during the assembly operation does not affect the bearing ring of hard plastic. It merely produces a preloading of the resilient bearing socket, the latter being of a material having the required flowability under pressure to produce the necessary resiliency for preloading. The bearing socket on the closed side of the housing and the preformed bearing ring on the exit side do not interact with one another. The limitation of the die stroke by means of the abutment bevel on the housing and the mating shoulder on the die prevents any undesirable deformation of the preformed bearing ring on the exit side of the ball joint. Even when there are variations in the die pressure during the assembly operation, all the ball joints produced have the same ease of motion. The above further provides a convenient calibration of the angular freedom of the ball joint by determining the diameter of the exit opening for the joint pin from the housing.

The angle of the annular end face of the housing, after deformation, corresponds to the periphery of the joint pin in its extreme angular position.

BRIEF DESCRIPTION OF THE DRAWING

In the accompanying drawing is illustrated, by way of an example, an embodiment of the invention, wherein.

DESCRIPTION OF THE PREFERRED EMBODIMENT

Finished Ball Joint

Figure 1:
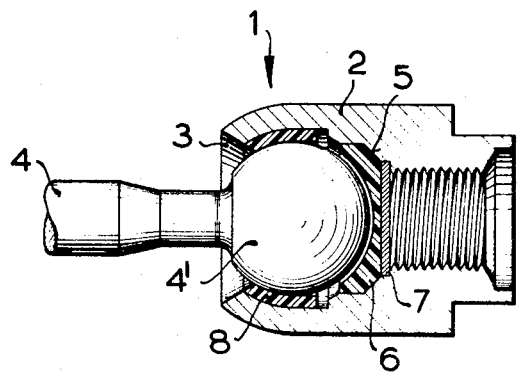
FIG. 1 shows a longitudinal cross section of a ball joint embodying the invention.

FIG. 1 illustrates, in cross section, an axial ball joint designated in its entirety by 1. The housing pin which is not shown and a joint pin 4 extend in opposite directions from the ball joint. Such a ball joint is used, for example, in rack and pinion steering mechanisms in automobiles on the inner tie rod joint. A joint housing 2 is made of forged steel or of cast iron. From the housing 2 extends a joint pin 4 through an exit opening 3 in the housing. On the side opposite the opening 3, the housing cavity includes a tapered inner shoulder 5. Inside the joint housing 2 is positioned a resilient element in the form of a bearing socket 6 of elastic synthetic plastic. The material selected for this bearing socket may be, for example, polyurethane. The resilient bearing socket 6 is supported against the inner shoulder 5 of the housing. Adjacent to the bearing socket is provided a cover disc 7 of sheet metal. On the exit side of the joint pin 4 is provided a preformed bearing ring 8 of hard synthetic plastic. The resilient bearing socket 6 compensates for inconsistencies in the inner height of the ball joint and also gives the joint a limited elasticity.

Assembly Operation

Figure 3:
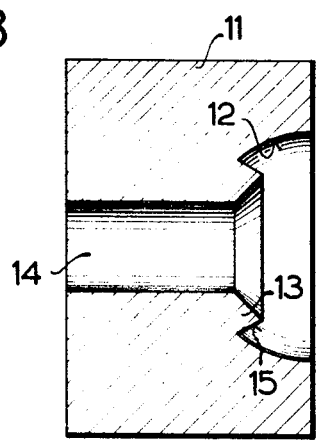
FIG. 3 shows the female portion of an assembly die.
Figure 2:
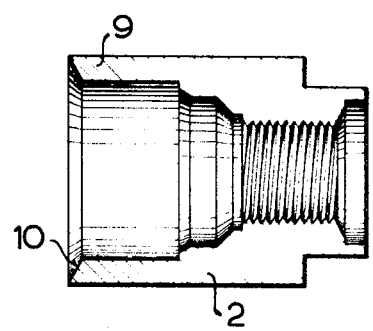
FIG. 2 shows the housing portion of the ball joint of FIG. 1 before assembly.

The assembly of the ball joint of the invention is obtained in the following manner:

FIG. 2 shows the shape of the joint housing 2 before assembly, the housing portion 9 on the exit side of the joint pin being cylindrical. Into the open housing 2 is first inserted the cover disc 7, followed by the resilient bearing socket 6. Next the joint pin 4 with its ball head 4' is inserted into the housing, and the bearing ring 8 is slipped over the joint pin 4 and into contact with the ball head 4'. In this configuration, the cylindrical portion 9 of the joint housing 2 is deformed in a crimping operation, using an assembly die 11 shown in FIG. 3.

The die 11 has a central bore 14 for the passage of the joint pin 4. The working face of the die is a concave, partially spherical recess 12 which engages the end portion 9 of the joint housing 2 under axial pressure. The inner end of the working surface 12 of the die is bordered by an annular shoulder 13 concentrically surrounding the bore 14. This annular shoulder has an abutment bevel 15 whose angle corresponds to the angle obtained on the beveled end face 10 of the housing portion 9 after it has been crimped over the ball head 4'. The angle of the end face 10 of the crimped housing in turn corresponds to the outline of the joint pin 4 when it is pivoted to its extreme angular position. The recess, shoulder and abutment bevel form a broad-based W-shaped area.

In the crimping operation, the die 11 is pressed against the housing portion 9, thereby deforming the latter to partially wrap around the ball head 4'. The bearing ring 8 is positioned between the ball head and the housing portion 9. The abutment bevel 15 on the die 11, by positively limiting the stroke of the die and the crimping deformation, produces a calibrated diameter and beveled end face 10 on the housing opening 3, so that the inner dimensions of the ball joint can be maintained with comparatively great accuracy and consistency in mass production.

In cases where the ball joint is to be subjected to extremely heavy tension loads, the crimped end of the housing may be designed to include an annular reinforcement shoulder, the shoulder preventing any possible stretching of the opening after the crimping operation under any kind of operational load.

It is further possible to provide retainer means on the bearing ring and/or bearing socket to prevent their rotation inside the ball joint.

While the invention has been described, it will be understood that it is capable of further modifications and this application is intended to cover any variations, uses or adaptations of the invention following in general the principles of the invention and including such departures from the present disclosure as come within known or customary practice in the art to which the invention pertains, and as may be applied to the essential features hereinbefore set forth and as fall within the scope of the invention or the limits of the appended claims.

I claim:

1. A ball and socket joint comprising:
   a. a housing,
   b. a joint pin,
   c. a ball head on said joint pin positioned within a cavity in said housing,
   d. said housing cavity having a tapered inner shoulder at one end thereof and an opening through which said joint pin extends at the other end thereof,
   e. a resilient bearing socket surrounding a portion of said ball head and positioned in said housing cavity against said tapered inner shoulder,
   f. said housing cavity being closed by a cover disc positioned adjacent said tapered inner shoulder,
   g. a preformed bearing ring surrounding a portion of said ball head and positioned adjacent said opening, and
   h. the portion of said housing adjacent said opening being deformed to substantially conform to the shape of said ball head.

* * * * *